United States Patent
Sloan et al.

(10) Patent No.: US 6,869,059 B2
(45) Date of Patent: Mar. 22, 2005

(54) BAKEABLE MUFFIN PAN, AND USE THEREOF

(75) Inventors: William E. Sloan, New Prague, MN (US); Matthew W. Lorence, Plymouth, MN (US)

(73) Assignee: The Pillsbury Company, Minneapolis, MN (US)

( * ) Notice: Subject to any disclaimer, the term of this patent is extended or adjusted under 35 U.S.C. 154(b) by 380 days.

(21) Appl. No.: 09/997,771

(22) Filed: Nov. 29, 2001

(65) Prior Publication Data

US 2002/0078833 A1 Jun. 27, 2002

Related U.S. Application Data (60) Provisional application No. 60/250,321, filed on Nov. 30, 2000.

(51) Int. Cl.[7] .................................................. A23P 1/00
(52) U.S. Cl. ......................... 249/126; 249/134; 99/426; 220/573.1; 220/912
(58) Field of Search ................................. 249/126, 119, 249/134, 121, DIG. 1; 426/512; 99/426, 448; 220/573.1, 912; D7/357

(56) References Cited

U.S. PATENT DOCUMENTS

| | | | | |
|---|---|---|---|---|
| 23,930 | A | * | 5/1859 | Kroeter ...................... 156/540 |
| 112,254 | A | | 2/1871 | Ingersoll |
| 341,057 | A | | 5/1886 | Schelp |
| 346,528 | A | | 8/1886 | Beattie |
| 402,411 | A | | 4/1889 | Davis |
| 1,554,077 | A | | 9/1925 | Fay |
| 1,861,124 | A | | 5/1932 | Lorber |
| 2,037,821 | A | | 4/1936 | Prabell |
| D112,254 | S | * | 11/1938 | Jackson ...................... D7/357 |
| 2,138,241 | A | | 11/1938 | Koch et al. |
| 2,188,492 | A | | 1/1940 | Young |
| 2,493,854 | A | | 1/1950 | Brainard |
| 2,599,853 | A | | 6/1952 | McClain et al. |
| 2,793,955 | A | | 5/1957 | Selmer |
| 2,813,799 | A | | 11/1957 | Bender et al. |
| 3,191,796 | A | | 6/1965 | Schwartz et al. |
| 3,197,058 | A | | 7/1965 | Hale |
| 3,212,903 | A | | 10/1965 | Oberholtzer |
| 3,393,074 | A | | 7/1968 | Ehrlich |
| 3,520,439 | A | | 7/1970 | Smith et al. |
| 3,638,827 | A | * | 2/1972 | Lau, Jr. et al. ............. 206/507 |
| 3,651,976 | A | | 3/1972 | Chadbourne |
| 3,737,029 | A | | 6/1973 | Serrell et al. |
| 3,783,089 | A | | 1/1974 | Hurst et al. |
| 3,896,239 | A | | 7/1975 | Peters |
| 3,976,796 | A | | 8/1976 | Peters |

(List continued on next page.)

OTHER PUBLICATIONS

Poly Concepts Inc., Brochure for Tray Away™; Jul. 8, 1984; 5 pgs.
Declaration Of Matthew W. Lorence, dated Feb. 2002.

*Primary Examiner*—James P. Mackey
*Assistant Examiner*—Donald Heckenberg
(74) *Attorney, Agent, or Firm*—Timothy A. Czaja; Annette M. Frawley; Douglas J. Taylor (57) ABSTRACT

A pan for baking a batter or dough to provide a baked good, such as muffins or cupcakes. The pan includes a raised perimeter wall that acts as a shield or baffle to provide consistent air flow over the batter or dough during baking. The resulting baked goods have improved baked properties. A preferred muffin pan is disclosed.

24 Claims, 6 Drawing Sheets

U.S. PATENT DOCUMENTS

| | | |
|---|---|---|
| 3,989,154 A | 11/1976 | Walklet |
| 4,051,266 A | 9/1977 | Goltsos |
| 4,195,747 A | 4/1980 | Hare |
| 4,229,859 A | 10/1980 | Gagliardi, Jr. et al. |
| 4,522,301 A | 6/1985 | Ajmera |
| 4,530,426 A | 7/1985 | Mylander |
| 4,694,961 A | 9/1987 | Menendez |
| 4,750,318 A | 6/1988 | Matsuzawa |
| 4,812,321 A | 3/1989 | Vandervoort et al. |
| 4,857,353 A | 8/1989 | Jackson et al. |
| 4,875,620 A | 10/1989 | Lane, Sr. |
| 4,904,493 A | 2/1990 | Petrizzelli |
| 4,911,304 A | 3/1990 | Bunin |
| 5,014,851 A | 5/1991 | Wick |
| 5,110,038 A | 5/1992 | Pantisano et al. |
| 5,124,519 A | 6/1992 | Roy et al. |
| 5,178,893 A | 1/1993 | Seewi et al. |
| 5,312,634 A | 5/1994 | Griesbach et al. |
| 5,358,118 A | 10/1994 | Thompson et al. |
| 5,360,116 A | 11/1994 | Schmiletzky |
| 5,361,687 A | 11/1994 | deVries |
| 5,393,032 A | 2/1995 | Cederroth |
| D361,514 S * | 8/1995 | Krupa et al. .................. D9/456 |
| 5,510,135 A | 4/1996 | Galder |
| 5,613,609 A | 3/1997 | Hamilton et al. |
| 5,632,924 A | 5/1997 | Gics et al. |
| 5,656,318 A | 8/1997 | Baisley |
| 5,695,798 A | 12/1997 | Rozzano |
| 5,729,958 A | 3/1998 | Kearney et al. |
| 5,888,572 A | 3/1999 | Gics et al. |
| 5,904,249 A | 5/1999 | Roulin et al. |
| 5,954,204 A | 9/1999 | Grabowski |
| 6,086,931 A | 7/2000 | Whiteford |
| 6,112,548 A | 9/2000 | Moenickheim |
| 6,450,341 B1 | 9/2002 | Krupa et al. |

* cited by examiner

BAKEABLE MUFFIN PAN, AND USE THEREOF

Priority under 35 U.S.C. § 119(e) is claimed to provisional application Ser. No. 60/250,321, filed on Nov. 30, 2000, and entitled "BAKEABLE, PRE-DEPOSITED MUFFIN PAN". The complete disclosure of application No. 60/250,321 is incorporated by reference herein.

This invention relates to pans for baking bakery goods. In particular, this invention relates to pans that provide improved baking characteristics to the baked goods.

BACKGROUND

Bakery products, and in particular muffins, are a common breakfast item. Common muffins include bran, blueberry, poppyseed, banana and banana-nut, lemon, cranberry, and others. In addition to being eaten for breakfast, muffins are often consumed as snack items throughout the day. There are various flavors of muffins that are generally directed to the snack food market; such flavors include chocolate, chocolate chip, and white chocolate.

With the rushed pace of most people's schedules, the majority of muffin consumers do not make and bake their own muffins. Rather, the majority of muffins are purchased in a ready-to-eat form.

Although many bakeries make the muffin batter themselves, it is very common for the batter to be provided to the bakery pre-deposited in a non-bakeable tray. This pre-deposited batter is usually frozen while in the tray, and the entire tray is shipped to the baker. Because of issues associated with the cost and weight of the tray, these trays are typically made from a non-metallic or non-conductive material, such as plastic. To bake the batter, the batter is removed from the tray and transferred to another pan for baking. The baking pans are typically metal pans, but attempts have been made to bake muffins in nonconductive pans.

Unfortunately, many times muffins baked in non-conductive pans have less than desirable baked characteristics. For example, often, muffins at the perimeter of the pan are more cooked than muffins in the center of the pan. Additionally, the tops of the muffins are often unevenly browned, asymmetrically shaped, or both. One common backing characteristic, known as "capping", is commonly seen and is particularly undesirable. Capping occurs when the top has set (i.e., hardened), and then this top is pushed up, allowing batter from the interior of the muffin to ooze out to the side. The result is an undesirable muffin.

What is desired is an improved pan that can be used for baking bakery products, such as muffins.

SUMMARY

The present invention is related to a pan for baking baked goods, such as muffins. The pan provides improved baking characteristics to the resulting baked good by modifying the flow of air around the batter or dough during baking. This same pan can be used for storing and shipping the uncooked batter or dough, and for selling the baked good to the consumer. In most instances, prior to being baked, the batter or dough is frozen in the pan. One preferred pan includes a stacking feature, which allows multiple pans to be stacked but not nested.

The pan according to the present invention has a perimeter wall that extends above the main surface of the pan. This wall extends above the level of the batter or dough in the pan and preferably extends above the level of the final baked product in the pan. This perimeter wall forms a shield or baffle for the baking batter or dough and provides more consistent heat to the batter or dough than if no wall was present. The more consistent air flow improves the peak or crown shape of the baked good, provides maximum baked height of the product, and provides circumferential symmetry to the good. The wall perimeter is also beneficial by reducing the setting rate of the muffin, which leads to decreased "capping" of the baked good. The amount of improved baking characteristic seen will depend on any of the pan material and the height of the perimeter wall, and can also depend on the oven used for the baking and the composition of the batter or dough.

The composition of the batter or dough may also be a variable on the amount and type of baking characteristics encountered when using a pan having a perimeter wall according to the present invention. In addition to the improved baked properties, the wall protects the baked good when the baked good and pan are plastic wrapped for sale.

A pan, having a perimeter wall according to the present invention, can be used for making any baked goods, such as muffins, cakes, cupcakes, rolls, doughnuts, bagels, and other such items.

DETAILED DESCRIPTION

The present invention is directed to a non-conductive pan for baking batters or doughs to provide baked goods such as muffins, cakes, rolls, and other such goods. The batters or doughs baked either in or on the pan of the present invention typically have a leavening agent as an ingredient.

The pan of the present invention modifies the flow of air so that during baking of the batter or dough, to improve baking performance or properties of the batter or dough are experienced. The terms "baking performance", "baked property", "baking characteristics" and other such terms, refer to the overall characteristics of the resulting baked product. These characteristics are generally physical characteristics, such as shape of the product (typically the top surface or cap), symmetry of the product, and maximum baked height. The terms "in the pan" and "on the pan" are used interchangeably, and no specific meaning is intended if one term is used instead of the other.

The pan of the present invention has a perimeter wall that extends above the top surface of the face of the pan. This wall extends above the level of the batter or dough in the pan and preferably extends above the level of the final baked product in the pan. This wall forms a shield or baffle for the baking batter or dough and provides more consistent heat flow to the batter or dough than if no wall was present.

Although the pan of the present invention can be a pan for baking any items such as muffins, cakes, cupcakes, rolls, doughnuts, bagels, and other such items, the following description is directed to a pan for baking muffins therein. It is understood that the features of this muffin pan can be incorporated into pan for other bakery items and remain within the scope of this invention.

Figure 1:
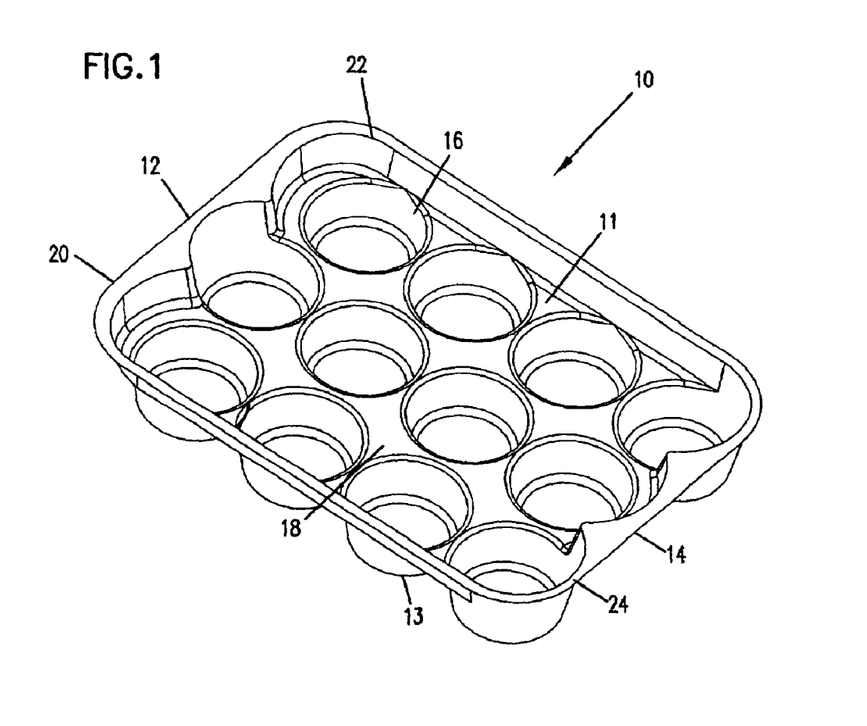
FIG. 1 is a perspective view of a muffin pan according to the present invention.

Referring now to the Figures, one embodiment of a muffin pan according to the present invention is shown. In FIG. 1, pan 10 has a generally planar top surface 11, a bottom surface 13, a first end 12 and a second end 14 opposite from first end 12. Pan 10 has a plurality of receptacles 16, sized and shaped to hold an amount of muffin batter and to retain the muffin once baked. The portion of receptacles 16 positioned farthest from top surface 11 defines bottom surface 13; typically, these bottom surfaces are parallel to top surface 11. Positioned between receptacles 16 are land areas 18. Top surface 11 comprises and is defined by land areas 18. An outer edge of pan 10 is defined by perimeter 20. Extending from and above top surface 11 at perimeter 20 is wall 22.

Figure 2:
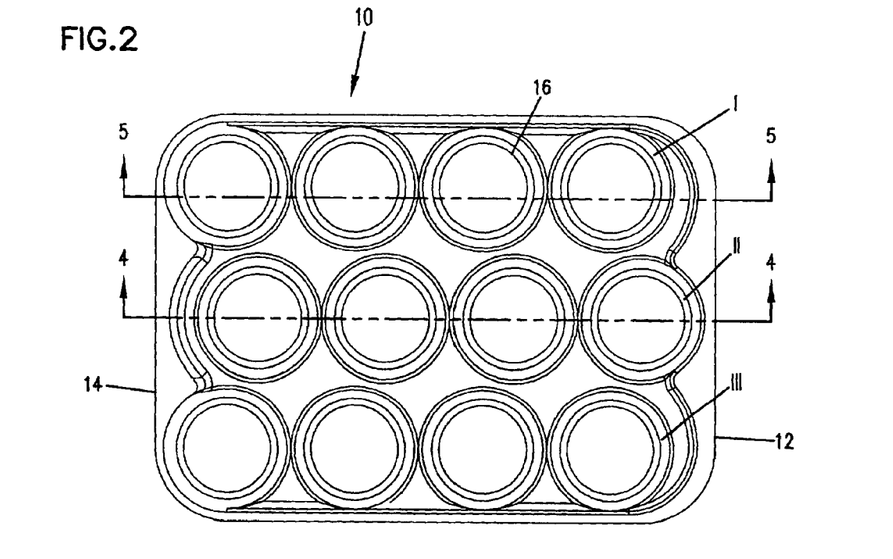
FIG. 2 is a plan view of the muffin pan of FIG. 1, the pan having been rotated approximately 180 degrees.

Best seen in FIG. 2, pan 10 has twelve receptacles 16, arranged in three rows, I, II and III, each row having four receptacles 16, extending from first end 12 to second end 14. Receptacles 16 of row I are staggered or offset from receptacles 16 of row II. Similarly, receptacles 16 of row II are staggered or offset from receptacles 16 of row III. In pan 10, receptacles 16 of row I and receptacles 16 of row III are positioned so that a line drawn from the center of a receptacle 16 of row I to the center of a receptacle 16 of row III does not pass through the center of a receptacle 16 of row II. This staggered characteristic of the receptacles 16 provides various desirable qualities to pan 10.

Figure 3:
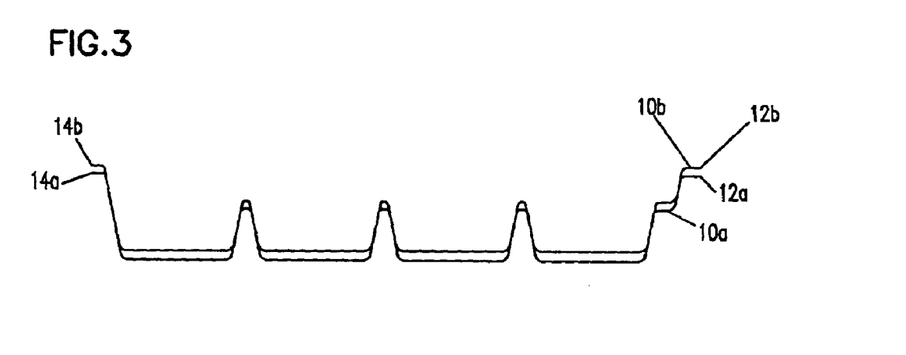
FIG. 3 is a schematic cross-sectional view of multiple muffin pans according to the present invention, taken along line 5—5 of FIG. 2, that are stacked and nested.
Figure 4:
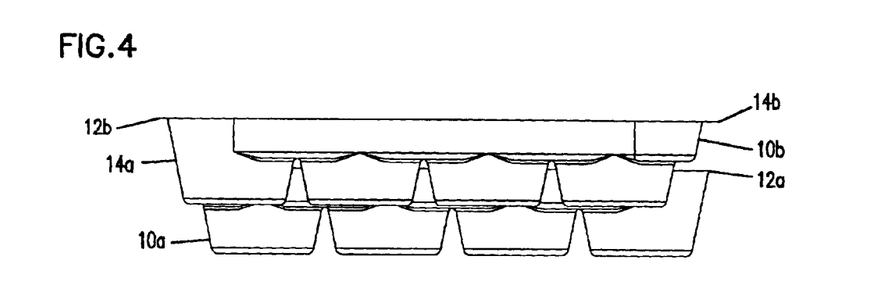
FIG. 4 is a cross-sectional view of multiple muffin pans according to the present invention, taken along line 4—4 of FIG. 2, that are stacked but not nested.
Figure 5:
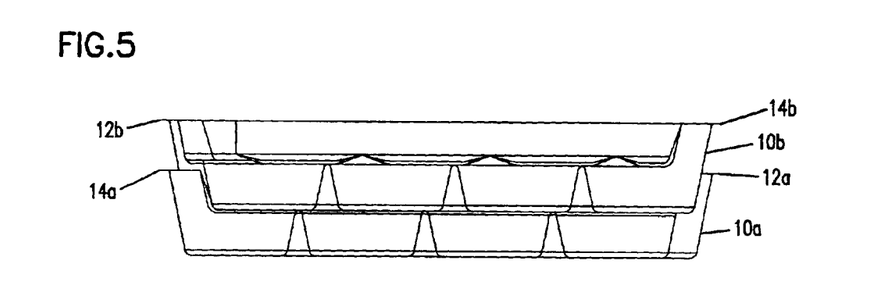
FIG. 5 is a cross-sectional view of multiple muffin pans according to the present invention, taken along line 5—5 of FIG. 2, that are stacked but not nested.

Referring to FIGS. 3, 4 and 5, benefits of staggering receptacles 16 are shown. In FIG. 3, two pans 10a, 10b are shown stacked and nested. Pans 10a, 10b are positioned so that second end 14a of pan 10a is aligned with second end 14b of pan 10b. Pan 10b is snuggly nested into pan 10a, so that the multiple pans occupy minimal space. Such stacking and nesting of multiple pans is beneficial during shipping or storage of unfilled pans.

In FIGS. 4 and 5, two pans 10a, 10b are again shown stacked, but one of pans 10a, 10b is rotated 180 degrees so that the pans do not nest. In each of FIGS. 4 and 5, pan 10b is positioned so that first side 12b is aligned with second side 14a of pan 10a, and second side 14b is aligned with first side 12a. The bottom surface 13 (see FIG. 1) of the upper pan, i.e., pan 10b, rests on top surface 11 (see FIG. 1) of the lower pan, i.e., pan 10a. Such stacking of multiple pans is beneficial during shipping and storage of filled pans having batter or dough therein. This stacking allows any batter within receptacles 16 to be undisturbed by the adjacent pans. Further, stacking in this manner eliminates the need for a liner or slip sheet between adjacent pans. Any suitable features can be incorporated into pan 10 to allow two pans to be stacked without nesting. Examples of such stacking features or elements, that allow stacking without nesting, include offset or misaligned receptacles 16 (such as present in pan 10); uneven or unequal land areas (such as described with respect to pan 10', below), these unequal land areas being positioned, for example, at an end of the pan, a side edge, or between adjacent rows of receptacles; posts, bumps, ribs, shoulders, protrusions or other raised features, and any other suitable elements that allow stacking of multiple pans without nesting.

The stacking feature of the pan can be designed to allow for any suitable degree of rotation of the pan. For example, if the pan, such as pan 10, is a rectangular pan having a length different than the width, the pan should be rotatable by 180 degrees. If the pan is a square pan, with all four sides equal, the pan could be rotatable by 90 degrees, 180 degrees, or 270 degrees. If the pan is a circular pan, preferably the amount of rotation is at least about 10 degrees, although any amount of rotation that inhibits nesting of multiple pans is acceptable.

It is also understood that when stacking made pans in accordance with the present invention, whether including a stacking feature or not, may be used with a liner, slip sheet, interleaf, or other suitable divider between pans. Examples of suitable dividers include flexible dividers such as paper (e.g., parchment paper) or plastic, and rigid dividers such as corrugated board, paper board, container board, carton board, and rigid plastic.

Figure 9:
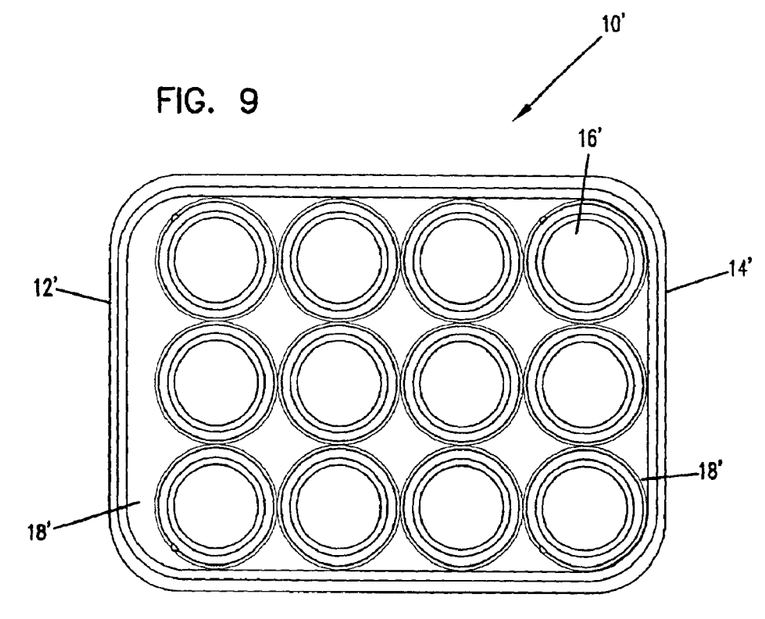
FIG. 9 is a plan view of a second embodiment of a muffin pan according to the present invention.

FIG. 9 shows a second embodiment of a muffin pan according to the present invention. Pan 10' is similar to pan 10 of FIGS. 1 through 5, in that pan 10' has twelve receptacles 16', arranged in three rows of four, extending from first end 12' to second end 14'. Pan 10' differs from pan 10 in that receptacles 16' of adjacent rows are not staggered; rather, receptacles 16' are aligned. Pan 10' provides the same stacking benefits, in that two pans 10' can be stacked to either nest or not nest when every other pan 10' is rotated. This is due to land area 18' at first end 12' being larger than land area 18' at second end 14'.

To facilitate rotated stacking of multiple pans 10, 10', pan 10, 10' can include an indicator to identify the orientation of pan 10, 10'. For example, first end 12, 12' can be designed with an indicator such as a cut-out notch or swirl, a dimple, textured or knurled surface, or the like. Such an indicator will designate to the person stacking multiple trays whether the trays are stacked in an alternating manner and will provide a quick indication as to into which orientation the next pan should be.

In the embodiment of pan 10 shown in the figures, lands 18 are planar areas. In alternate embodiments, lands 18 may include posts, ribs, or other three-dimensional features extending upward away from first surface 11 and receptacles 16. Such features can occupy the entire area of land 18 or only a portion thereof. The features can be designed to further distribute the air flow over the batter or dough during baking, to facilitate packaging of the baked muffins in pan 10 by providing support for plastic wrapped over the muffins, or to stabilize multiple stacked, but non-nested, pans. Alternately or additionally, lands 18 may include apertures therein to provide air circulation through the pan. Further, additionally or alternatively, pan 10, 10' can include protrusions at lands 18, 18' that are designed to stabilize stacked, non-nested pans. Further, protrusions, ridges, or other structures, any of these being continuous or discontinuous, can be included in or on top surface 11 to increase the rigidity of the pan and minimize flexing. These protrusions, ridges or other structures may additionally baffle or otherwise disrupt the flow of heated air during baking, thus acting as a localized perimeter wall around each individual receptacle 16, 16', and further improving the baked characteristics of the resulting baked good. Protrusions, ridges and other structures can also be used to distance plastic wrapping film or other covers or lids from the baked goods, or can provide stackable features to the pans.

The number of receptacles 16, 16' in pan 10, 10' can be any number, but is generally selected for the convenience of selling the baked muffins or other baked goods produced in the pan. Twelve circular receptacles 16, 16' are preferred, so that the muffins can be sold by the dozen, however, any number of receptacles 16, 16' can be present in pan 10, 10', from one to, for example, 48. Preferred numbers of receptacles 16, 16' include four, six, nine, and twelve. Pans 10, 10' can include perforations, score lines, or other areas of weaknesses that allow for breaking apart or otherwise separating individual receptacles 16, 16'. For example, a pan having 12 receptacles can be configured to break into three separate pans, four receptacles each, after baking, to allow selling of the baked goods in smaller quantities.

The size of receptacles 16, 16' can be any suitable size. The size of receptacles 16, 16' will take into account the number of receptacles, 16, 16', their shape, and the size and shape of pan 10, 10'. Generally, receptacles 16, 16' can be sized to hold as little as one ounce of batter or dough or less. Alternately, receptacles 16, 16' can be sized to hold as much as twelve ounces of batter or dough, or even more. In pan 10, 10', each receptacle 16', 16' is intended to hold five to seven ounces of batter, and is intended to be lined with a paper or foil liner prior to having the batter inserted therein, although for some muffins no liner is desired. It is understood that if the pan is to be used for smaller muffins, such as mini-muffins, the pan may have 24 or 36 receptacles therein, each receptacle holding about one ounce of batter.

Similarly, the shape of the receptacles is not in anyway limited. Examples of usable receptacle shapes include circles, squares, ovals, triangles, and starts. Typically, receptacles 16, 16' have a circular cross-sectional area, taken parallel to top surface 11, that increases as it nears top surface 11.

It is understood that if the pan is one to be used for baked goods other than muffins, for example, a cake, the number of receptacles in the pan will generally be less, such as only one or two receptacles. Additionally, the amount of batter to be retained within the receptacles will be significantly more, such as 48 ounces.

Referring again to pan 10 of FIGS. 1 through 8, the overall size of pan 10, as defined by perimeter 20 can be any suitable size, but is typically about 17 to 18 inches long and about 12 to 13 inches wide. This size may be more or less, depending on the desired overall size and the oven or other storage container into which pan 10 must fit. Similarly, the shape of pan 10 can be any suitable shape, such as rectangular (including square), circular, triangular, but is typically rectangular.

It is preferred that pan 10 is sized and shaped to optimally fit on a flat baking tray. For example, pan 10 can be designed so that two pans 10 fit on a standard commercial baking tray, which is about 25 inches by 18 inches (63.5 cm by 45.7 cm). Alternately, pan 10 can be designed so that one pan 10 fits in and occupies the rack area in a conventional residential oven. In another instance, pan 10 can be sized and shaped so that four pans 10 fit on a standard commercial baking tray. The tray, which supports pan 10 in the oven, can be a solid continuous tray, have perforations therein, or be wire rack. In some embodiments, pan 10 may be used in a rack oven, where pan 10 is slid onto side rails and no support tray is used. The same dimensions and configuration can be used for pan 10' of FIG. 9.

At perimeter 20 of pan 10 is perimeter wall 22. Wall 22 has a height that extends above top surface 11 away from receptacles 16. Generally, the height of wall 22 above top surface 11 is 0.1 to 3 inches (0.254 cm to 7.62 cm), preferably 0.5 to 2.5 inches (1.27 cm to 6.35 cm), and more preferably about 1 to 2 inches (2.54 cm to 5.1 cm). The height of pan 10, taken from bottom surface 13 (defined by the bottom most portion of receptacles 16) to the top of wall 22, is about 1.5 to 4 inches (3.81 cm to 10.16 cm). Typically, wall 22 extends away from top surface 11 and does not decrease in height; that is, wall 22 is at its maximum height at perimeter 20. Preferably, wall 22 is continuous and at a constant height around perimeter 20 of pan 10. Additionally and preferably, wall 22 has a constant and continuous slope associated therewith; that is, wall 22 is not stepped or terraced as it extends from top surface 11. Wall 22 forms an angle with top surface 11 that is typically at least 90 degrees and typically no greater than 135 degrees; 100 degrees is a preferred angle. Cornice or lip 24 may be present at the top of wall 22.

Figure 6:
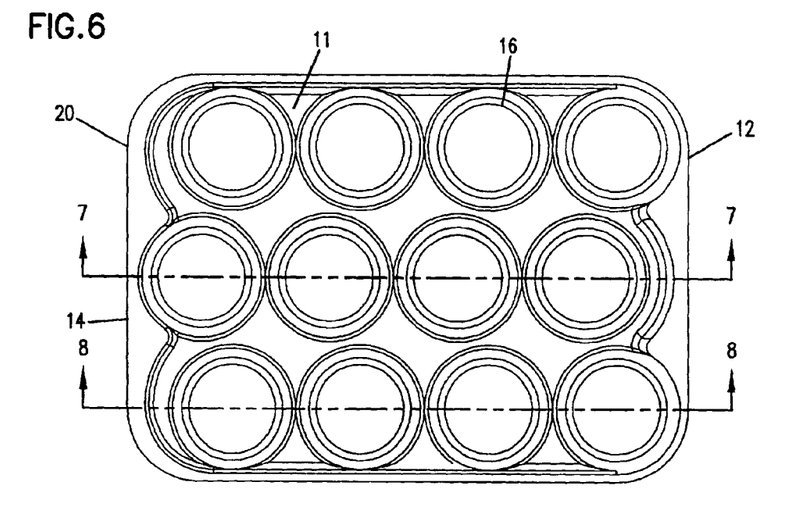
FIG. 6 is a plan view of the muffin pan, the view being similar to that of FIG. 2.
Figure 7:
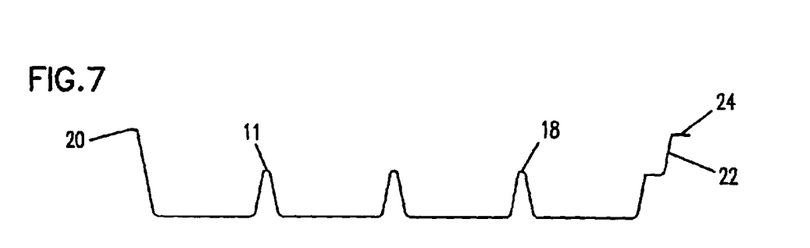
FIG. 7 is a schematic cross-sectional view of the muffin pan taken along line 7—7 of FIG. 6.
Figure 8:
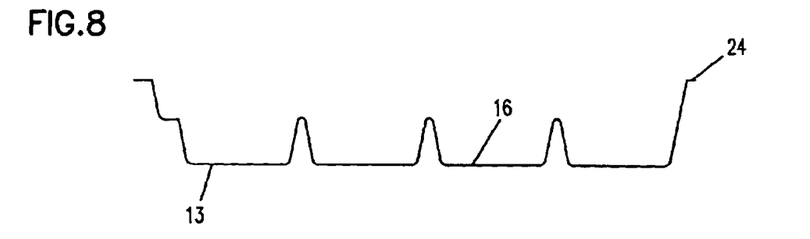
FIG. 8 is a schematic cross-sectional view of the muffin pan taken along line 8—8 of FIG. 6.

Preferred dimensions for pan 10 are shown in FIGS. 6, 7 and 8. For example, a preferred size of pan 10 is 17.761 inches by 12.898 inches (45.113 cm by 32.761 cm), the length of 17.761 inches (45.113 cm) being measured from first end 12 to second end 14. The height of wall 22 for pan 10 is 1.250 inches (3.175 cm). The overall height of pan 10, from bottom surface 13 to the top of wall 22, is 2.750 inches (6.985 cm). Because the walls of receptacles 16 are sloped, the length of pan 10 along bottom surface 13 is 15.267 inches (38.778 cm). The rounded external corners have a radius of 2.249 inches (5.712 cm).

Each receptacle 16 of FIGS. 6, 7 and 8 is intended to hold approximately 6.5 ounces of batter, and is 1.500 inches (3.810 cm) deep; that is, it is 1.500 inches (3.810 cm) from top surface 11 to bottom surface 13. The bottom most portion of each receptacle 16 has a diameter of 3.267 inches (8.298 cm). The sloped walls of receptacle 16 form an angle of 100 degrees with bottom surface 13 of receptacle 16, with the interior angle having a radius of 0.250 inch (0.635 cm). Adjacent receptacles 16 of a row are 4.000 inches (10.160 cm) apart, on center. The centers of receptacles 16 of adjacent rows are 4.020 inches (10.211 cm) apart.

In FIG. 7, showing the cross-section of the center row of receptacles 16, land areas 18 between receptacles 16 are 0.204 inch (0.518 cm) in width, and have a radius of 0.093 inch (0.236 cm). The width of land 18 at first end 12, between receptacle 16 and wall 22 is 0.693 inch (1.760 cm); land 18 forms an angle of 100 degrees with wall 22 at a radius of 0.250 inch (0.635 cm). Cornice 24, at first end 12, has a width of 0.521 inch (1.323 cm). In FIG. 8, which shows the cross-section of a row of receptacles 16 adjacent the row shown in FIG. 7, land area 18 at second end 14, between receptacle 16 and wall 22 is 0.682 inch (1.727 cm); land 18 forms an angle of 100 degrees with wall 22 at a radius of 0.250 inch (0.635 cm). Cornice 24, at first end 12, has a width of 0.311 inch (0.790 cm).

Referring again to FIG. 1, pan 10 has wall 22 that extends from top surface 11 away from receptacles 16; wall 22 includes cornice 24 extending away from receptacles 16. FIG. 3 shows wall 22A of pan 10A. Wall 22 extends above top surface 11 a distance that is above the level of the batter or dough in receptacles 16 and preferably extends at least as high as the crowns of the resulting muffins of pan 10. Wall 22 forms a shield or baffle for the baking batter or dough and provides improved baking characteristics than if no wall was present. Wall 22 channels the flow of hot air so that the flow of air over the top of the batter or dough is more evenly distributed and more consistent than if no wall was present. The more consistent air flow improves the peak or crown shape of the baked muffin, provides maximum baked height of the muffins, and provides circumferential symmetry to the muffin.

Pan 10, 10' is made from a material that can withstand the temperatures at which the batter is baked; typically, the baking temperatures range from 300° F. to 450° F. (about 149° C. to 232° C.), even though higher or lower temperatures may be used depending on the batter, the pan material, and the oven used for baking. Common baking temperatures include 350° F. (177° C.), 375° F. (190° C.), and 400° F. (204° C.). The material from which pan 10, 10' is made can withstand the temperature swing associated with having pan 10, 10' frozen in a freezer (generally less than about 10° F. (−12° C.) and even less than about −10° F. (−23° C.)) to the baking temperature. That is, the pan material should be able to withstand temperature ranges of at least about 320° F. (160° C.), preferably at least about 370° F. (188° C.), more preferably at least 395° F. (202° C.), and most preferably at least 470° F. (243° C.).

Examples of usable materials for pan 10, 10' include polymeric materials such as thermosetting polymeric materials and thermoplastic polymeric materials that have a melting temperature greater than the baking temperatures. A preferred polymeric material for pan 10, 10' is crystallized polyethylene terephthalate, commonly referred to as CPET.

Further examples of suitable materials for pan 10, 10' include cellulosic materials, such as materials that include paper pulp. Generally, cellulosic and pulp materials are molded to form the desired pan 10, 10'. Paper pans may include a food-contact liner, such as polyester or a water-based acrylic material, particularly if the pan is to be used without liners.

Metal foil, such as aluminum, is another example of a material useable for forming pan 10, 10', or for forming a portion of pan 10, 10', such as the outer surfaces. Typically, however, pan 10, 10' is made from a non-metallic, non-conductive material.

Pan 10, 10' of the present invention, as stated above, can be sized and shaped to allow for optimum placement into the oven being used for baking. Examples of ovens suitable for use with pan 10, 10' include rack ovens, convection ovens, conventional residential ovens, and any oven found in food service operations; these ovens may be gas or electric.

Figure 10:
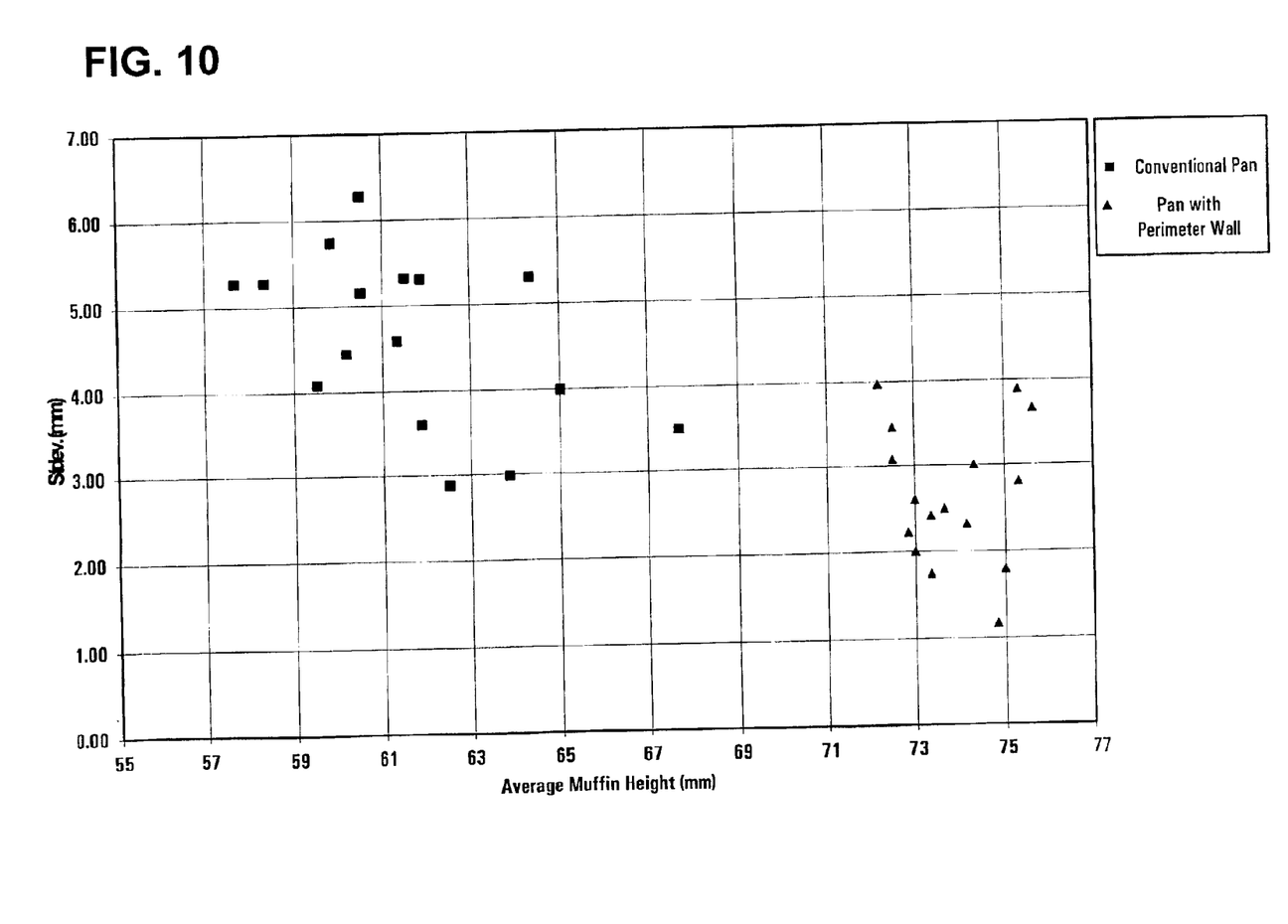
FIG. 10 is a graphical representation of the height of muffins baked in a pan according to the present invention, particularly, the pan shown in FIG. 9.
Figure 11:
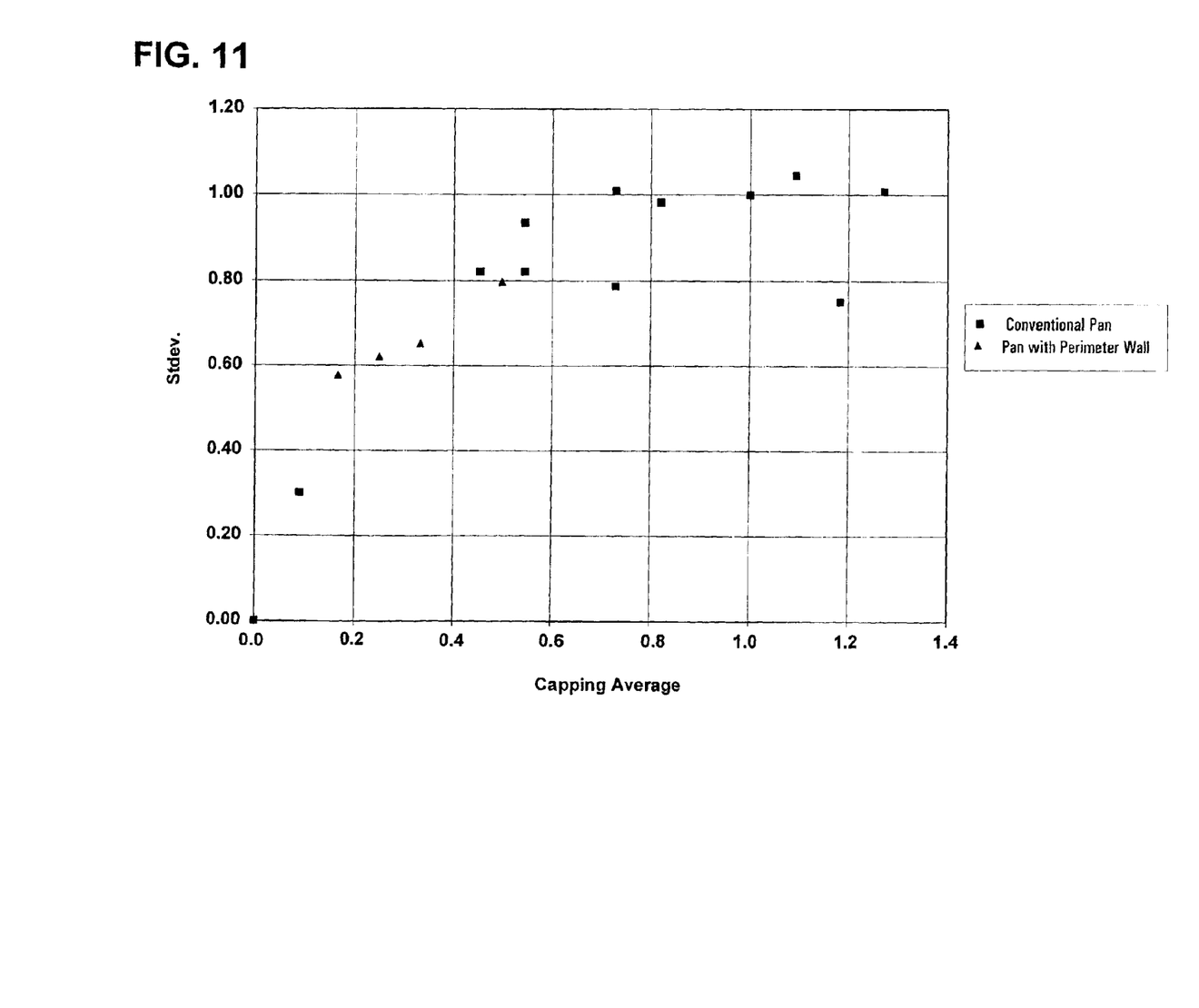
FIG. 11 is a graphical representation of the capping of muffins baked in a pan according to the present invention, particularly, the pan shown in FIG. 9.

FIGS. 10 and 11 compare baking characteristics of muffins baked in a pan according to the invention having a perimeter wall with muffins baked in a pan having no wall. For the tests, the pan having a perimeter wall was pan 10' of FIG. 9 having a wall height of about 1.250 inches (3.175 cm); the comparative pan was a similar pan which had the wall cut off even with the level of top surface 11. The pans were made from CPET.

The recipe for the muffins baked was a conventional blueberry muffin recipe which included bleached enriched flour (bleached flour, malted barley flour, niacin, iron, thiamin mononitrate, riboflavin, folic acid), water, sugar, soybean oil, blueberries, high fructose corn syrup, eggs, modified corn starch, whey, monoglycerides, baking powder (backing soda, sodium aluminum phosphate), salt, artificial flavor, xanthan gum, guar gum, propylene glycol mono- and di- esters of fatty acids, corn starch, sodium stearoyl lactylate.

Approximately 6.5 ounces of the batter was deposited into the receptacles and placed in a conventional commercial rack oven. The oven had eight racks, each rack supporting two pans. The batter was baked at 375° F. (190° C.) for approximately 45 minutes.

FIG. 10 shows the average height muffin height for muffins baked in the walled pan and those baked in the pan having no perimeter wall. Each data point represents the average height of the 12 muffins baked in one pan. For the walled pan, 16 pans of muffins were baked, and for the unwalled pan, 16 pans of muffins were baked.

Each data point in FIG. 10 is the average muffin height and average muffin height standard deviation for each of the pans of 12 muffins. From the data point groups in FIG. 10, it can be seen that the muffins baked in a pan according to the present invention, overall, had greater height with a smaller standard deviation. Additionally, the range of the average height of the muffins in the 16 perimeter pans was less that the range of muffin height for those baked in the 16 conventional pans; that is, there was a broader variability in the height average when baked in the 16 conventional pans than when baked in the pans according to the present invention. This shows there was less pan-to-pan average height variation when a walled pan was used. A somewhat smaller range of standard deviation was seen for the perimeter pans than with the conventional pans.

FIG. 11 shows the average muffin capping value and standard deviation of the value for muffins baked in the walled pan and those baked in the conventional pan having no perimeter wall. "Capping" was subjectively evaluated by examining the baked muffin characteristics and the amount of capping observed was assigned a qualitative number. The capping values assigned were whole numbers from 0 to 2; "0" meant that no capping was observed; "1" meant that a little oozing of batter occurred out from under the muffin cap; and "2" meant that there was severe oozing, caused by the cap lifting up and batter squishing out the side.

Each data point on FIG. 11 represents the average qualitative "capping" degree of the 12 muffins baked in one pan; sixteen data points for each of the conventional pan and the walled pan according to the present invention were plotted. It should be noted that several data points are located at "0" capping and "0" standard deviation, which represents the ideal muffin shape, according to this test. From FIG. 11 it can be seen that muffins baked in a pan according to the present invention had an overall lower qualitative capping average with a small standard deviation.

The amount of improved baking characteristic observed will depend on the pan material, oven used, and the composition of the batter or dough. It is believed that wall 22 provides varying degrees of improvement depending on the leavening agent used in the batter or dough, the viscosity of the batter or dough, or both. Other characteristics of the batter or dough may also affect the degree of improvement observed.

In addition to the improved baked properties, wall 22 protects the muffins when the baked muffins and pan 10, 10' are plastic wrapped for sale. Instead of wrapping with plastic or other such flexible material, rigid domes or lids can be used with pan 10, 10'. These domes or lids can be designed to releaseably, yet securely snap or otherwise attach to pan 10, 10', particularly onto wall 22.

As discussed above, pan 10, 10' is used for baking batter or dough to provide baked goods. Pan 10, 10' will typically also be stored and shipped with the batter or dough positioned in or on pan 10, 10'. Many times, this will be done while the batter or dough is frozen. Further, pan 10, 10' can be used to display the baked good. In many instances, the entire pan, with the baked goods secured therein, will be sold to the consumer, although in some instances the baked goods can be removed from pan 10, 10' and pan 10, 10' be reused. In some embodiments and as discussed above, the pan 10, 10' in which the baking occurs can be divided or separated into multiple units prior to being displayed for sale.

It is understood that any variations of the features of pan 10, 10' described above will fall within the scope of the present invention. The above specification provides a complete description of the manufacture and use of the invention. Many embodiments of the invention can be made.

We claim:

1. A baking pan comprising:
    a first surface defining:
    at least a first row of receptacles and a second row of receptacles;
    a wall extending from the first surface and terminating in a pan perimeter; and
    a stacking feature defined by a position of the second row of receptacles relative to the pan perimeter such that a distance between a first receptacle in the second row and a nearest pan perimeter is less than a distance between a last receptacle in the second row and a respective nearest pan perimeter;
    wherein the stacking feature is configured such that in a first orientation of the pan relative to a second, identical pan, the stacking feature permits nesting of the pans, and in a second orientation the stacking feature permits stacking of the pans.

2. The pan according to claim 1, the pan made from a material comprising a non-conductive material.

3. The pan according to claim 1, wherein a height of the wall is about 0.5 inch to 2.5 inches.

4. The pan according to claim 3, wherein the height of the wall is about 1 inch to 2 inches.

5. The pan according to claim 2, wherein the non-conductive material is crystallized polyethylene terephthalate.

6. The pan according to claim 1, wherein the first surface defines a plurality of receptacles.

7. The pan according to claim 1, wherein the first surface defines a planar land area between adjacent receptacles.

8. The pan according to claim 6, wherein the plurality of receptacles are aligned in the first row and in the second row, the second row having at least two receptacles.

9. The pan according to claim 1, wherein the receptacles of the first row are aligned with the receptacles of the second row.

10. The pan according to claim 1, wherein the receptacles of the first row are misaligned with the receptacles of the second row.

11. The pan according to claim 6, wherein the first surface defines twelve receptacles.

12. The pan according to claim 6, wherein the first surface defines at least six receptacles.

13. The pan according to claim 1, wherein the pan perimeter defines a length of about 17 inches and a width of about 12 inches.

14. The pan according to claim 1, further comprising an air distribution feature.

15. The pan according to claim 1, further comprising a removable lid attached thereto.

16. A set of baking pans comprising:
    a first pan; and
    a second pan;
    wherein each of the first pan and the second pan includes:
    a first surface defining at least a first row of receptacles and a second row of receptacles,
    a wall extending from the first surface and terminating in a pan perimeter,
    a stacking feature defined by a position of the second row of receptacles relative to the pan perimeter such that a distance between a first receptacle in the second row and a nearest pan perimeter is less than a distance between a last receptacle in the second row and a respective nearest pan perimeter.

17. The pan of claim 7, wherein the planar land area includes at least one of a post, rib, protrusion, ridge, and a three dimensional structure.

18. The pan of claim 7, wherein the planar land area defines an aperture configured to permit air flow through the pan.

19. The pan of claim 1, wherein a first distance is defined between a first pair of adjacent receptacles and a second distance is defined between a second pair of adjacent receptacles, the first and second distances being unequal.

20. The pan of claim 1, further comprising an indicator configured to identify the orientation of the pan.

21. The set of baking pans of claim 16, wherein the stacking feature is configured such that when the first pan is in a first spatial orientation and the second pan is in the first spatial orientation, assembly of the second pan to the first pan assembly is characterized by the receptacles of the second pan nesting within the receptacles of the first pan.

22. The set of baking pans of claim 21, wherein the stacking feature is further configured such that when the first pan is in the first spatial orientation and the second pan is in a second spatial orientation, assembly of the second pan to the first pan is characterized by the receptacles of the second pan being stacked above the receptacles of the first pan.

23. The set of baking pans of claim 22, wherein in the second spatial orientation, the second pan is rotated by 180 degrees relative to the first pan.

24. The set of baking pans of claim 22, further comprising a liner disposed between the first pan and the second pan.

* * * * *